United States Patent [19]

Sauer

[11] Patent Number: 5,760,744
[45] Date of Patent: Jun. 2, 1998

[54] ANTENNA PANE WITH ANTENNA ELEMENT PROTECTED FROM ENVIRONMENTAL MOISTURE EFFECTS

[75] Inventor: Gerd Sauer, Stolberg/Venwegen, Germany

[73] Assignee: Saint-Gobain Vitrage, Courbevoie, France

[21] Appl. No.: 596,136

[22] PCT Filed: Jun. 15, 1995

[86] PCT No.: PCT/FR95/00787

§ 371 Date: Apr. 29, 1996

§ 102(e) Date: Apr. 29, 1996

[87] PCT Pub. No.: WO95/34921

PCT Pub. Date: Dec. 21, 1995

[30] Foreign Application Priority Data

Jun. 15, 1994 [DE] Germany ............... 44 20 903.7

[51] Int. Cl.⁶ ............................ H01Q 1/32; H01Q 1/38
[52] U.S. Cl. ........................ 343/700 MS; 343/713; 29/600
[58] Field of Search ............... 343/700 MS, 713, 343/846, 848, 872, 873; 29/600

[56] References Cited

U.S. PATENT DOCUMENTS

| | | | |
|---|---|---|---|
| 3,987,449 | 10/1976 | DeAngelis et al. | 343/713 |
| 4,401,988 | 8/1983 | Kaloi | 343/700 MS |
| 4,415,900 | 11/1983 | Kaloi | 343/700 MS |
| 4,633,262 | 12/1986 | Traut | 343/700 MS |
| 5,097,270 | 3/1992 | Lindenmeier | 343/713 |
| 5,307,076 | 4/1994 | Murakami | 343/713 |
| 5,382,959 | 1/1995 | Pett et al. | 343/700 MS |
| 5,448,250 | 9/1995 | Day | 343/713 |
| 5,528,314 | 6/1996 | Nagy et al. | 343/713 |
| 5,534,879 | 7/1996 | Braun et al. | 343/713 |

*Primary Examiner*—Donald T. Hajec
*Assistant Examiner*—Tan Ho
*Attorney, Agent, or Firm*—Oblon, Spivak, McClelland, Maier & Neustadt, P.C.

[57] ABSTRACT

A laminated antenna pane is provided with an antenna element for the reception of high-frequency electromagnetic waves (in the gigahertz range), and of a counter-electrode connected to earth. The antenna element is disposed on the outwardly orientated face of the inner sheet, inside the pane, while the counter-electrode is situated on the opposite face of the inner sheet. A layer of air is between the antenna element and the inwardly oriented face of the outer sheet of the laminated antenna pane to prevent any perturbation of the antenna signal due to humidity on the exterior of the antenna pane.

14 Claims, 1 Drawing Sheet

ANTENNA PANE WITH ANTENNA ELEMENT PROTECTED FROM ENVIRONMENTAL MOISTURE EFFECTS

BACKGROUND OF THE INVENTION

1. Field of the Invention

This invention deals with an antenna pane composed of an antenna element and a counter-electrode connected to earth. The antenna element is situated on the face towards the outside of the first flat dielectric, within the pane, while the counter-electrode is situated on the opposite face of this first dielectric. A second dielectric, having a dielectric constant (or permittivity) less than that of glass, is disposed between the antenna element and the outer face of the antenna pane.

2. Discussion of Background

This type of antenna is suitable for the transmission or reception of radio waves in the microwave range, with frequencies greater than 300 MHZ. They may be used as fixed antennas or for vehicles, in particular for radio-telephone communication s of the digital network, for digital radio communications by satellite, or as receiving antenna for remote detection systems by satellite, such as the GPS (Global Position System), which enables the position of a vehicle to be localized, wherever it may be. So that they may function correctly, it is necessary to limit their activity to a narrow frequency band and regulate them with great accuracy. They must also be able to maintain this capacity when the environment is a source of parasitic emissions. This is why it is appropriate to keep them clean and also to protect them from external perturbation or attenuation factors.

According to one type of antenna described in patent DE 38 34 075 A1, a second dielectric is disposed between the antenna element and the outer face of the panel, in order to reduce the influences of the environment upon the antenna element.

In the case of an antenna pane of this type, it is possible for the second dielectric to be made of different materials. According to a first example this is the polyvinyl butyral that serves for connecting together the different sheets of a laminated pane, which fulfils the function of second dielectric. In another example the second dielectric will be a plate of plastic material having an extended surface, which is placed on the antenna element. That document mentions also an example for which the second dielectric would occupy a recessed region of the external glass sheet of a laminated pane. For all the examples referred to, the antenna pane is brought in to direct mechanical contact, over its entire outwardly facing area, with a solid component made from the second dielectric material.

This well known type of antenna structure still has a certain vulnerability to the influences of the environment and can be perturbed, in particular, when the glass sheet is wetted by rain water or atmospheric humidity.

SUMMARY OF THE INVENTION

The invention has as its objective to create an improved version of an antenna pane of the type mentioned, the resonance frequency of which would be still less altered by the humidity present on the panel, and thus to achieve a good degree of efficiency and high attentuation of the adjacent channels for antennas of narrow frequency band.

This objective is achieved according to the invention by an antenna pane, in which the antenna element is separated form the inwardly orientated face of a glass sheet forming the antenna pane by a larger of air forming a second dielectric.

The invention therefore provides that the antenna pane shall be constructed in such a manner that a layer of air is situated between the external glass sheet and the antenna element.

Thus, the antenna element is still more effectively isolated from the humidity with which the outer side of the glass sheet is in contact, and which is a source of particularly strong perturbation, as well as from deposits which can cause an attenuation.

The antenna element can equally well be placed, according to this invention, on a monolithic pane as on a laminated pane.

One appropriate realization of an antenna pane according to the invention made of a laminated pane comprising at least two glass sheets joined together by a thermoplastic sheet, has as its special feature a layer of air formed by the hollow region of the thermoplastic sheet.

A first type of realization may be so arranged that the antenna element is placed, inside the hollow region of the thermoplastic sheet, on the face orientated towards the outside of the inner sheet, inside the panel. For this construction, the inner sheet of the laminated pane forms the first dielectric material, between the antenna element and the counter-electrode.

Another form of embodiment, for which the layer of air is formed by the hollow in the thermoplastic sheet, may be realized in such a way that the antenna element is placed on the face of the inner sheet that is towards the interior (i.e. towards the passenger compartment of the vehicle). This method has the advantage of greatly facilitating the production of the antenna pane. It is indeed necessary to hollow the thermoplastic sheet during the production of the laminated pane, but the mounting of the antenna element on the inner face of the inner glass sheet may certainly be carried out after the assembly phase of the laminated pane.

Whereas it is necessary, for the known antenna panes, to apply an electrically conducting construction on to both sides of the glass sheet having an extended surface, the invention allows the conducting plate of the antenna, the dielectric sandwiched between it and the counter-electrode, and said counter-electrode, all to be installed on one side only of the glass sheet.

The production of the antenna structure may be performed in different ways, for example by means of a silk screen. It is, however, especially suitable to glue, in the hollow region of the thermoplastic sheet, a prefabricated piece comprising several layers which carries the antenna structure, on to the inwardly oriented face of the inner glass sheet.

One preferred realization of an antenna pane, according to this invention, has the following features: the antenna element is connected to the inner face of the inner sheet by a spacer. Thus an air layer is formed between the inner sheet and the antenna piece, which is constituted of the antenna element, the first dielectric and the counter-electrode, which is connected there. In this way, all the parts of the antenna responsible for the quality of reception are isolated, in the space, by a dielectric material, which enables them to be protected from the perturbing influences of the environment. According to this realization, the antenna piece may be placed on a monolithic pane. In the case of a laminated pane, this preferred realization can, once again, have a hollow region in the thermoplastic material at the location of the antenna element, and thus make the isolation still more effective, since the layer of air is doubled.

The spacer and the antenna structure may be a prefabricated element, which is placed on the glass sheet intended to be on the inner side. This makes possible a particularly simple and rapid installation of the antenna structure of the glass sheet. This model offers, in addition, a total protection of the antenna element from the perturbing influences of the environment and thus assures an optimum frequency stability.

The shape and dimensions of the conducting plate of the antenna and of the counter-electrode are adapted to the transmission and reception frequencies used, as well as to the polarization state of the waves. This means that the conducting plate will have the shape of a narrow strip in the case of waves polarized in a rectilinear manner, whereas it will have a flat shape of equal dimensions in all directions in the case of waves polarized in a circular manner, as is the case for the GPS system. The position of the antenna foot is chosen as a function of the impedance desired for the antenna foot. For the frequencies used, the dimensions of the antenna conducting plates are of the order of a few centimeters. The dimensions of the counter-electrode should, themselves, be clearly greater than those of the conducting plate, whatever the case envisaged.

BRIEF DESCRIPTION OF THE DRAWINGS

Other advantages, as well as suitable realizations and improvements of the invention, are developed in the claims, and also in the description of examples of embodiment prepared with reference to the figures, which show:

DISCUSSION OF THE PREFERRED EMBODIMENTS

Figure 1:
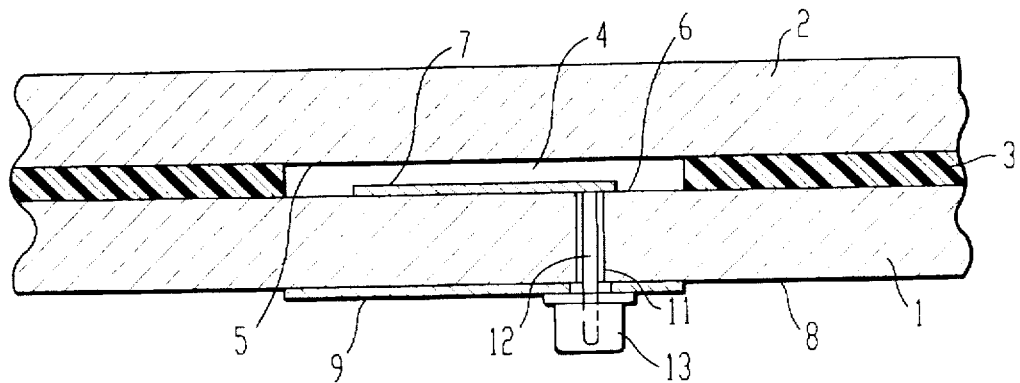
FIG. 1—a sectional view through a laminated pane provided with an antenna element situated between the two glass sheets, FIG. 2—a sectional view through a laminated pane equipped with an antenna structure disposed on the inner side, FIG. 3—a sectional view through a monolithic pane equipped with an antenna structure kept separated from it.

The laminated pane shown in section in FIG. 1 consists of two glass sheets 1 and 2, each 2 mm thick, assembled together by means of a thermoplastic sheet 3 of 0.76 mm thickness made, for example, of polyvinyl butyral. After the installation of the laminated pane in a building or on a vehicle, the sheet 2 will be at the outside. The thermoplastic sheet 3 possesses, in one of its parts, a hollow region 4. A metal antenna element 7 is disposed, in this hollow region 4, on the face 6 towards the outside of the building or vehicle of the inner sheet 1, inside the panel. The air contained in the hollow region 4 constitutes an ideal dielectric, with a dielectric constant (or relative permittivity) $\epsilon r=1.006$. This intermediate space, filled with air and corresponding to the hollow region 4, between the element 7 and the inner face 5 of the glass sheet 2, forms the second dielectric, a metal counter-electrode 9 is installed on the inner face 8 of the sheet 1. The antenna element 7 and the counter-electrode 9 may be made of an enamel film, applied by means of a silk screen and then baked, and which is electrically conducting. The antenna element 7 is connected to an electronic circuit (which is not shown here) by means of a contact pin 12, which passes through the sheet 1 via the hole 11 and which serves as a junction with a connecting element for a coaxial cable. The tubular connecting piece 13 of the counter-electrode 9 is situated on the sheath of the cable.

The hole 11 may also serve for balancing the pressure inside the hollow region 4, when the glass sheets 1, 2 and the thermoplastic sheet 3 are assembled together by heat and pressure, and thus avoid the risk of the glass sheets being destroyed, at this location, by a high pressure.

Figure 2:
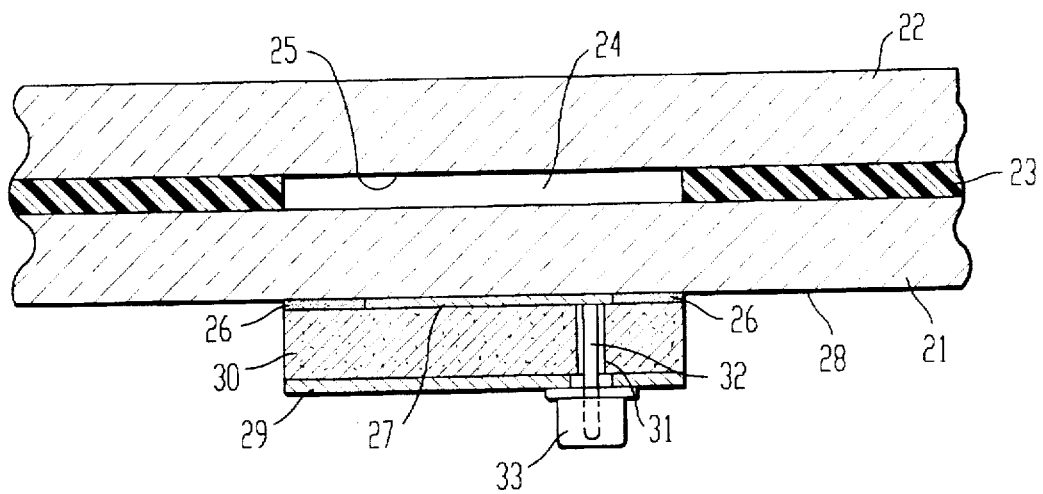

The laminated pane shown in FIG. 2 is formed of two sheets 21 and 22 of glass, joined together by means of a thermoplastic sheet 23. The sheet 22 is situated at the outside, in the structure of the laminated pane. The thermoplastic sheet 23 is, here again, provided with a hollow region 24. The layer of air formed by this hollow region 24 constitutes the dielectric serving for insulating the antenna conducting plate 27 from the inner face 25 of the sheet 22.

The antenna element 27 is disposed, by means of an adhesive film 26, on the inner face 28 of the sheet 21. The counter-electrode 29 is isolated from the antenna element 27 by the dielectric 30. A hole 31 has been formed through this same dielectric 30. It is through this hole that the contract pin 32 passes, which connects the antenna element 27 to an electronic amplification circuit (not shown here). This circuit may be installed, over an insulating film, on that surface of the counter-electrode 29 which is orientated towards the interior, according to the structure of the pane. The counter-electrode itself is connected to earth by means of the tubular connection 33 and the sheath of the coaxial cable.

Figure 3:
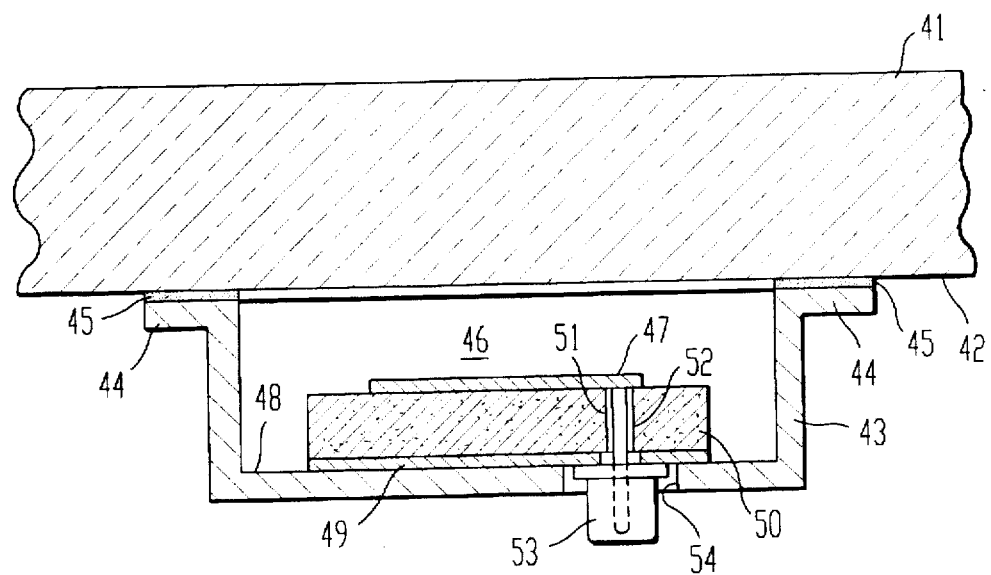

In the case of a monolithic antenna pane as shown in FIG. 3, a spacer 43 is connected, by means of its two surfaces 44 and two adhesive layers 45, to the inner surface 42 of the glass sheet 41. The antenna element 47, as well as the counter-electrode 49, are placed on the dielectric 50 in the form of metallic films, and formed together with this dielectric the structure of the antenna which, as such, is installed on the inner face of the spacer 43.

The antenna conducting plate is, as in the preceding examples, connected to the terminal of a suitable connection cable, by means of a contact pin 52 passing through the hole 51 formed in the dielectric 50, which pin fulfils the function of a junction with the connection of the coaxial cable. The connector piece 53, serving for connecting the counter-electrode 49 to earth, passes through the hole 54 in the wall 48 of the spacer 43.

For this type of model, an optimum isolation has been achieved of the components of the antenna with respect to the perturbing influences of the environment. The air layer 46, which proves to be an ideal dielectric, isolates the antenna element 47 as well as the counter-electrode 49 and the first dielectric 50, from the external perturbations.

It is also possible to construct larger layers of air for this type of model. For spacings, between the surface 42 of the glass sheet and the antenna element 47, of between 2 and 3 mm, it is possible to achieve a high stability of frequency, even in the case of very marked external perturbations.

It is possible to employ a gas other than air, or indeed a foam which will be constituted for the greater part of air or another gas, for filling the hollow region. Such foams are suitable, in particular if their volume contains at least 95% air, because in this way their dielectric constant (or relative permittivity $\epsilon r$) will be less than or equal to 1.1.

We claim:

1. an antenna pane comprising:
   an antenna element on an outwardly oriented face of a first flat dielectric element;
   a counter-electrode connected to earth and situated on a face of the first flat dielectric element directed opposite to the outwardly oriented face of the first flat dielectric element;
   a second dielectric portion having a dielectric constant or relative permittivity lower than that of glass, said second dielectric portion being disposed between the antenna element and an outer face of the antenna pane; and wherein the second dielectric potion comprises a gas layer, said gas being provided to at least in part separate the antenna element from an inwardly oriented face of an exterior glass sheet forming at least a part of the antenna pane.

2. The antenna pane according to claim 1, wherein the first flat dielectric element comprises an interior sheet of glass which is joined to the exterior sheet of glass by means of a thermoplastic sheet, and further wherein the gas layer is formed in a hollow region in the thermoplastic sheet between the interior and exterior glass sheets.

3. The antenna pane according to claim 2, wherein the antenna element is inside the hollow region of the thermoplastic sheet, and in that it is placed on a outwardly oriented face of the interior glass sheet.

4. The antenna pane according to claim 3, wherein the layer of gas comprises a foam including at least 95% air or another gas.

5. The antenna pane according to claim 2, wherein the antenna element is placed on a inwardly orientated face of the interior glass sheet.

6. The antenna pane according to claim 5, wherein the layer of gas comprises a foam including at least 95% air or another gas.

7. The antenna pane according to claim 1, wherein, the layer of gas is formed between the antenna element and an inner face of the inner glass sheet by means of a spacer.

8. The antenna pane according to claim 7, wherein the spacer has a U-shaped section and is joined to the glass sheet by means of an adhesive, and wherein the antenna element, the dielectric element, and the counter-electrode are placed on a face of the spacer oriented towards the glass sheet.

9. The antenna pane according to claim 8, wherein the layer of gas comprises a foam including at least 95% air or another gas.

10. The antenna pane according to claim 7, wherein the layer of gas comprises a foam including at least 95% air or another gas.

11. The antenna pane according to claim 1, wherein the layer of gas comprises a foam including at least 95% air or another gas.

12. Thye antenna pane according to claim 2, wherein the layer of gas is formed between the antenna element and an inner face of the glass sheet by means of a spacer.

13. The antenna pane according to claim 2, wherein the layer of gas comprises a foam including at least 95% air or another gas.

14. A method of making an antenna pane having at least two glass sheets, an intermediate thermoplastic sheet and an antenna structure including at least an antenna element and a counter-electrode, comprising:

hollowing out a region of the thermoplastic sheet;

forming a hole through at least one of the glass sheets;

assembling the thermoplastic sheet and the two glass sheets together to hold at least the antenna element in the hollowed out region of the thermoplastic sheet, said hollowed out region being in alignment with the hole formed through at least one of the glass sheets;

using heat and pressure to secure the two glass sheets together with the thermoplastic sheet having the hollowed out region aligned with the hole in the at least one glass sheet.

* * * * *